J. MILLER.
ANIMAL HOLDER.
APPLICATION FILED JAN. 11, 1913.

1,062,109.

Patented May 20, 1913.

2 SHEETS—SHEET 1.

WITNESSES:

INVENTOR
John Miller.

BY

ATTORNEY

J. MILLER.
ANIMAL HOLDER.
APPLICATION FILED JAN. 11, 1913.
1,062,109.
Patented May 20, 1913.
2 SHEETS—SHEET 2.
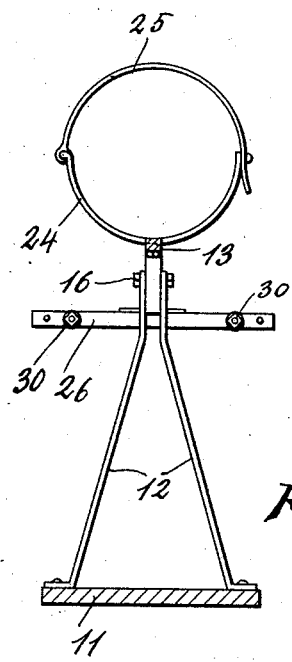
Fig. 3.
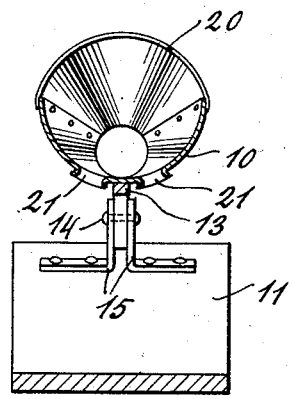
Fig. 4.
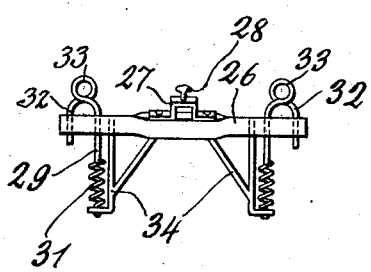
Fig. 6.
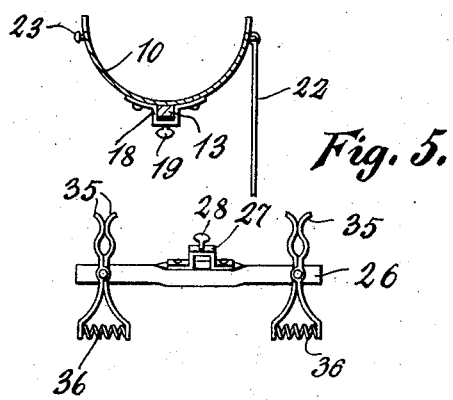
Fig. 5.
Fig. 7.
WITNESSES:
Einar Larson
INVENTOR
John Miller.
BY
ATTORNEY
COLUMBIA PLANOGRAPH CO., WASHINGTON, D. C.

UNITED STATES PATENT OFFICE.

JOHN MILLER, OF RADNOR, OHIO.

ANIMAL-HOLDER.

1,062,109.

Specification of Letters Patent.

Patented May 20, 1913.

Application filed January 11, 1913. Serial No. 741,560.

*To all whom it may concern:*

Be it known that I, JOHN MILLER, a citizen of the United States, residing at Radnor, in the county of Delaware and State of Ohio, have invented certain new and useful Improvements in Animal-Holders, of which the following is a specification.

The device which is the subject of the present invention is designed for holding hogs to facilitate the application of snout-rings, the performance of surgical operations, etc.

It is the object of the invention to provide a holder of the kind stated which is adjustable to animals of different sizes, which is simple in construction and which will securely hold without injury the animal to be operated on.

Other objects and advantages of the invention will be pointed out in the detailed description appearing hereinafter, and in order that the invention may be better understood, reference is had to the accompanying drawings, in which—

Figure 1:
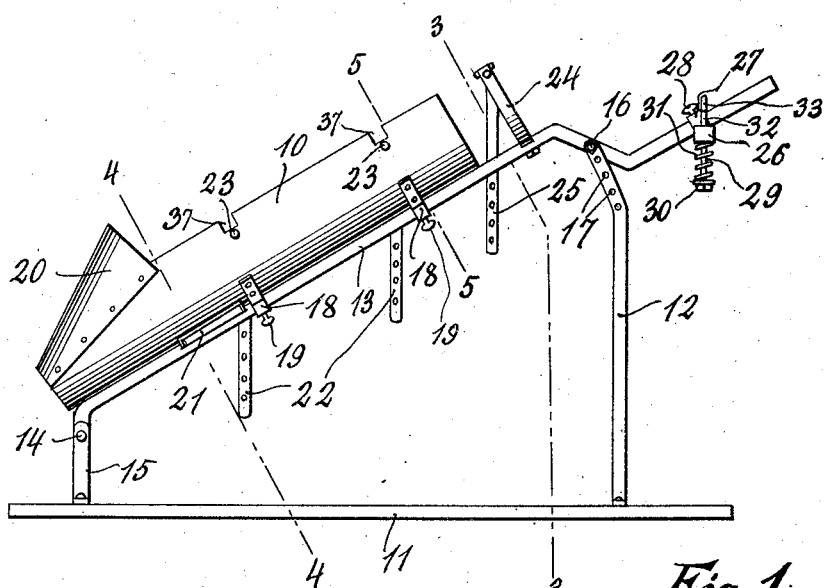
Figure 2:
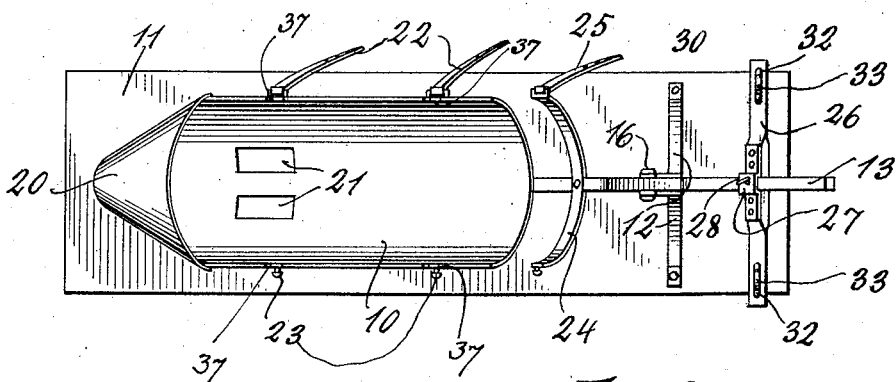

Figure 1 is a side elevation of the holder. Fig. 2 is a plan view thereof. Figs. 3, 4 and 5 are sections on the lines 3—3, 4—4, 5—5, respectively, of Fig. 1. Figs. 6 and 7 are modifications of the leg holder hereinafter referred to.

As shown in the drawings, the main body of the holder is a trough-shaped structure 10 in which the animal to be operated on is placed. Means are also provided for fastening the animal down in the holder, and for holding the legs. From a suitable base board 11 rise two standards 12 between the upper ends of which is fastened one end of a bar 13 which carries the trough 10. The other end of the bar is pivoted at 14 to a suitable stand 15 rising from the base board. The bar 13 is held at an inclination the lowest end being its pivoted end, which places the trough at a corresponding inclination. The other end of the bar is secured between the standards 12 by a bolt 16, a series of bolt holes 17 being provided so that the angle of the bar and the trough may be varied. On the bottom of the trough are secured clips 18 through which the bar passes, and by means of set screws 19 passing through the clips and engaging the bar, the trough is secured to the latter. Upon loosening the set screws, the trough is released, and it may then be moved up or down on the bar and thus raised or lowered.

The lower end of the trough 10 carries a hood 20 which extends across the top thereof and is adapted to inclose the animal's head with only the snout projecting from the lower end of the trough and hood, so that the ring may be applied.

Adjacent to the rear end of the hood 20, the trough 10 has side openings 21 to accommodate the animal's front legs, the same being stuck through said openings.

In order to hold the animal down in the trough 10, the latter has attached to one of its edges straps 22 which are passed across the back of the animal in the trough and made fast on the other side of the trough by means of buttons 23. A short distance to the rear of the trough, the bar 13 carries a transverse strip 24 curved to conform to the transverse curvature of the trough, and carrying a strap 25 at one end adapted to be secured in the same manner as the straps 22. This extra strap is designed to be used if the animal is so big that the straps 22 are not sufficient.

The following means are provided for holding the hind legs of the animal: The upper end of the bar 13 carries a cross bar 26 projecting from opposite sides thereof and adjustably secured by means of a clip 27 and a set screw 28 in the same manner as the trough 10. Thus, the cross bar is adjustable toward and from the rear or upper end of the trough, according to the size of the animal. Each end of the cross bar carries devices for clamping the animal's legs to the cross bar, said devices comprising a rod 29 passing loosely through the cross bar and projecting from opposite sides thereof. One projecting end of the rod carries an abutment 30 between which and the cross bar is interposed a spring 31, the latter being coiled around the bar. The other projecting end of the rod has a hook-like bend 32 and a loop 33, the former passing rearward and loosely through the cross bar. The spring 31 tends to draw the bend 32 toward the cross bar, so that when the animal's foot is placed in said bend, it is clamped thereby against the cross bar. The loop 33 serves as a finger hold to facilitate the operation of the herein-described leg holder.

Fig. 6 shows a slightly modified form of leg holder, the same differing from the one just described in the manner of attachment of the spring 31, the same being connected at one end to the rod 29 and at its other end to a bracket 34 carried by the cross-bar 26.

Fig. 7 shows another form of leg holder the same comprising two pivotally connected jaws 35 held closed by a spring 36.

The top edges of the trough 10 are notched at 37 so that the straps 22 may be adjusted to small animals, said notches being adapted to receive the straps if a small animal is to be secured in the holder.

I claim:

1. An animal holder comprising a support, a trough mounted thereon and having at one end openings to accommodate the animal's front legs and a hood to extend around the animal's head, straps carried by the trough on one side thereof, means on the other side of the trough for securing said straps, a cross bar carried by the support to the rear of the trough, and means carried by said cross bar for securing the animal's hind legs.

2. An animal holder comprising a support, a trough mounted thereon, means for securing the animal in the trough, and means carried by the support for securing the animal's hind legs, said last-mentioned means being adjustable toward and from the trough.

3. An animal holder comprising a support, a trough mounted thereon, means for securing the animal in the trough, a cross bar carried by the support and adjustable toward and from the rear end of the trough, and means carried by said cross bar for securing the animal's hind legs.

In testimony whereof I affix my signature in presence of two witnesses.

JOHN MILLER.

Witnesses:
  E. S. JONES,
  H. W. JEWELL.

---

Copies of this patent may be obtained for five cents each, by addressing the "Commissioner of Patents, Washington, D. C."